UNITED STATES PATENT OFFICE.

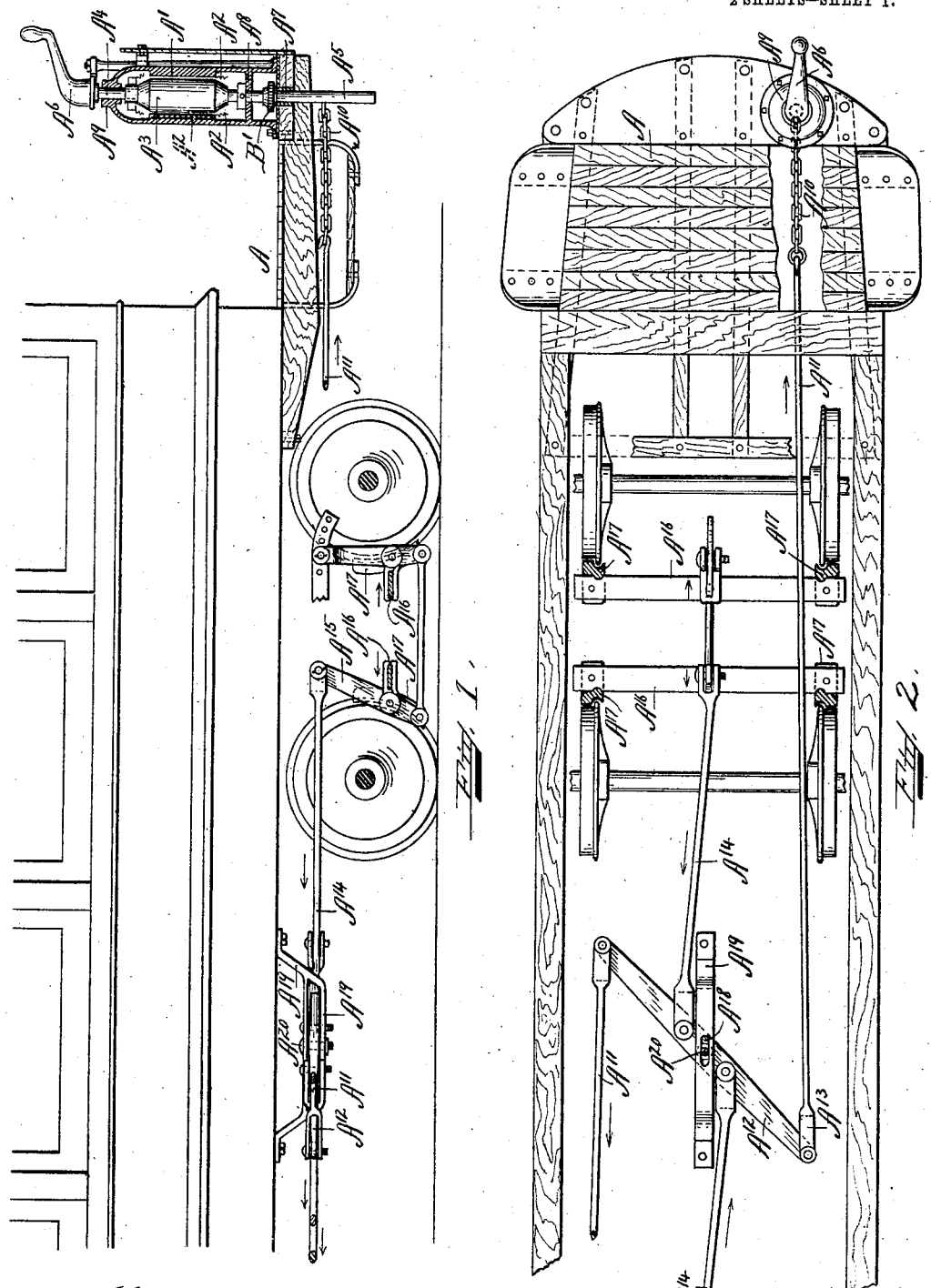

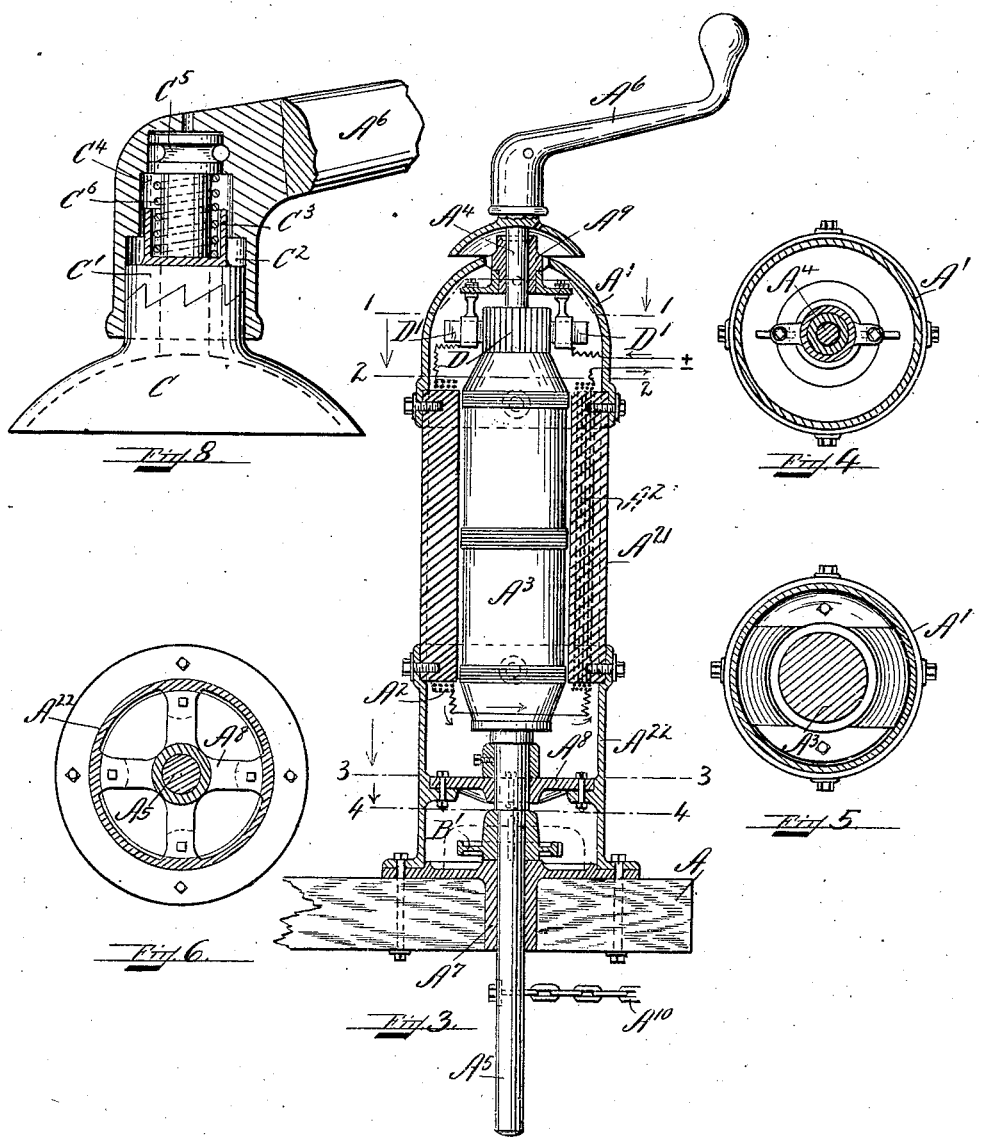

LOUIS PFINGST, OF BOSTON, MASSACHUSETTS, ASSIGNOR TO PFINGST ELECTRIC MANUFACTURING COMPANY, OF KITTERY, MAINE, A CORPORATION OF MAINE.

MECHANICAL POWER-BRAKE.

No. 857,752.   Specification of Letters Patent.   Patented June 25, 1907.

Application filed March 6, 1903. Serial No. 146,470.

*To all whom it may concern:*

Be it known that I, LOUIS PFINGST, of Boston, in the county of Suffolk and State of Massachusetts, have invented certain new and useful Improvements in Mechanical Power-Brakes, of which the following is a specification.

My invention relates to new and useful improvements in mechanical brakes and especially to brakes which are applied by electric motor to vehicles and cars.

The object of this invention is to apply the brakes of a vehicle or car by a power-driven brake-spindle capable of being operated by hand power mechanism separately or together for the winding of chain around the spindle when applying the brakes.

My invention consists of certain novel features hereinafter described and particularly pointed out in the claims.

In the accompanying drawings which illustrate a construction embodying my invention, Figure 1 is a side elevation of part of the car showing the location of the improved power brake spindle when not in operation with the shoes not applied to the wheels. Fig. 2 is a top plan view with the body of the car removed to show the power driven brake spindle located on the platform of the car, and also the brake mechanism with the shoes not applied. Fig. 3 is a sectional elevation of the motor or power driven shaft. Fig. 4 is a sectional view on the line 1—1 Fig. 3. Fig. 5 is a sectional view on the line 2 2 Fig. 3. Fig. 6 is a sectional view on the line 3 3 Fig. 3. Fig. 7 is a sectional view on the line 4 4 Fig. 3. Fig. 8 is an enlarged view partly in section of the ratchet in the brake handle.

Like letters of reference refer to like parts throughout the several views:

Above the platform A and attached thereto is the electric motor frame $A^{21}$, $A^{22}$, showing the field cores $A^2$ surrounding the armature $A^3$ which is built around the upright brake spindle $A^4$, the same extending below the platform as at $A^5$; to the upper end of the brake spindle $A^4$ is fitted a ratchet brake handle $A^6$. The spindle $A^4$ is held in its upright position in the bearings as supplied by the motor frame at $A^7$, $A^8$, $A^9$. The armature $A^3$ is provided with the commutator D of well-known construction in the art and co-operating with said armature are the usual commutator brushes $D'$ suitably supported as shown.

Secured to the extended spindle $A^4$ as shown at $A^5$ is a chain $A^{10}$ which is attached to brake rod $A^{11}$ at one end, and the other end of the rod is pivoted to the brake lever $A^{12}$ as shown at $A^{13}$.

In the operation of the brake mechanism, the motor is set in motion by allowing the current to flow through it, and which rotates the upright spindle $A^4$ thereby winding around its extended portion the chain $A^{10}$ which actuates the brake lever $A^{12}$ pulling on the rods $A^{14}$ extending its motion to the upright truck brake levers $A^{15}$ thence to the brake beam $A^{16}$ to the brake shoes $A^{17}$ thereby applying them to the car wheels stopping the car at any desired rapidity. To equalize the power generated over the various levers and rods there is provided a slot $A^{18}$ in the hanger $A^{19}$ located under the car and secured to the bottom frame permitting the pin $A^{20}$ in the lever $A^{12}$ to travel in the slot until the lengths of the levers and rods are equalized thereby bringing a uniform pressure on all of the car wheels. In addition to the power mechanism above described for applying the brake there is also provided and fitted to the spindle $A^4$, the ratchet brake handle $A^6$ which is capable of operating the spindle $A^4$ independent of its power mechanism and is adapted to take up the chain $A^{10}$ and rod $A^{11}$ which is pivoted at $A^{13}$ to the lever $A^{12}$, and in connection therewith is provided on the spindle $A^4$ the usual ratchet $B'$ and pawl B for holding the chain when the brake is taken up either by motor power or handle power. Fitted fast to the spindle $A^4$ is the lower ratchet member C with which is adapted to co-operate the ratchet member $C'$ loose on the spindle $A^4$ and surrounding the spindle, and loose in the chamber $C^2$; its upper portion is provided with a square nut $C^3$ which fits into a square chamber $C^4$; the upper end of the spindle $A^4$ is provided with a collar $C^5$ against which the upper end of the spring $C^6$ bears, while the lower end bears against the upper ratchet member $C'$ and tends to hold the two ratchet members in engagement. This ratchet brake handle is not claimed in this specification but forms the subject matter of a patent granted to me December 13, 1892, No. 487,768.

In applying the motor power mechanism, the brake handle being fitted with the ratchet mechanism, the operator may keep his hand on the handle while the brake is applied, thereby permitting the operator to hold the application of the brake, after the power has been turned off without calling into use the ratchet and pawl located at the bottom of the spindle and operated by the foot.

While it is not shown, yet it will be understood that any desired controller, switches, resistance and fuse box can be used for controlling the current before it enters the motor, receiving its source of supply from the trolley wire direct, or from any other source. It will be readily understood by any one conversant with the art, that the application of the brake can be attained instantaneously or as slowly as may be desired by the operator, with this construction.

Having thus described the nature of my invention and set forth a construction embodying the same, what I claim as new and desire to secure by Letters Patent of the United States is:

1. In an apparatus of the character described, an upright electric motor with extended shafts and the upper end fitted with a ratchet brake handle, the lower end equipped with a brake chain to be wound around the extended shaft for the applying or releasing of the car brakes.

2. In an apparatus of the character described, a brake spindle located on a vehicle or car equipped with an electric motor frame, a ratchet fitted to said spindle, and a pawl pivoted to the motor frame by a plate for the holding of wound-up chain when the electric current is cut off, in combination with hand power mechanism independent of the motor mechanism for operating said spindle.

3. In an apparatus of the character described, a power driven brake spindle, a loose handle for said spindle, electric motor having an armature surrounding said spindle, extended shafts and brake chain in combination with the brake mechanism for the applying and releasing of car wheel brake shoes.

4. In an apparatus of the character described, a power driven brake spindle in combination with the motor and hand power mechanism to simultaneously or independently wind or unwind the brake chain for actuating the brake mechanism.

5. In an apparatus of the character described, a power driven brake spindle equipped with a ratchet handle capable of being held by the operator in one position while the electric power is winding up chain holding by the handle that which is taken up with the current cut off.

6. In an apparatus of the character described, a power driven brake spindle adapted to wind up chain and let off at the same time or to hold what has been taken up, a motor for operating said spindle, and a ratchet brake handle.

7. In an apparatus of the character described, a power driven brake spindle adapted to wind up chain and let off at the same time or to hold what has been taken up, a motor for operating said spindle for winding up and unwinding the chain to apply or release the brake mechanism, and a ratchet brake handle.

8. In an apparatus of the character described, a power driven brake spindle, an armature motor for operating said spindle, and a loose handle for said spindle.

9. In an apparatus of the character described, a power driven brake spindle, an armature motor for operating said spindle, and a loose ratchet handle for said spindle.

10. In an apparatus of the character described, a power driven brake spindle, an armature motor for operating said spindle, a ratchet brake handle for said spindle, in combination with equalizing brake mechanism for applying or releasing the brakes.

11. In an apparatus of the character described, a power driven brake spindle, an upright electric motor for operating said spindle, an electric motor frame for said motor, a bearing for said spindle located in the platform, and an intermediate and an upper bearing for said spindle supported by the motor frame.

12. In an apparatus of the character described, a power driven brake spindle, a motor for operating said spindle, and a handle loosely revoluble on said spindle.

13. In an apparatus of the character described, a power driven brake spindle, a motor surrounding said spindle for operating the same, and a handle loosely revoluble on said spindle.

14. In an apparatus of the character described, a power driven brake spindle or shaft operated by an armature motor for applying or releasing the brakes and surrounded by the armature of said motor, and a loose handle for said spindle.

15. In an apparatus of the character described, a power driven brake spindle or shaft operated by an armature electric motor for applying or releasing the brakes and surrounded by the armature of said motor, and a loose handle for said spindle.

16. In an apparatus of the character described, hand power mechanism, a power driven brake spindle adapted to be operated independently of said hand power mechanism, and a motor for operating said spindle.

17. In an apparatus of the character described, a power driven brake spindle, a motor for operating said spindle, and a loose handle for said spindle in combination with equalizing brake mechanism for applying or releasing the brakes.

18. In an apparatus of the character described, a power driven brake spindle equipped with a loose hand power mechanism capable of being held by the operator in one position while the power is winding up the chain, and a pawl and ratchet for holding the taken-up chain with the current cut off.

19. In an apparatus of the character described, a power driven brake spindle, and an upright electric motor for operating said spindle with the commutated armature of said motor located between the bearings of the motor frame that surrounds the spindle and armature.

20. In an apparatus of the character described, an upright electric motor with extended shafts with the upper end fitted with a loose handle and the lower end equipped with a brake chain to be wound around the lower extended shaft for the applying or releasing of the car brakes.

21. In an apparatus of the character described, a power driven brake spindle or shaft operated by a commutated armature motor with the commutated armature surrounding its shaft and the commutated armature surrounded by the magnetic pole or poles for applying or releasing the brakes of a vehicle or car.

22. In combination, a rotatable member, a motor connected to rotate said member, a handle loosely mounted on said member, and means whereby said member may be rotated by said handle.

23. In combination, a motor with an extended shaft, a handle loosely connected with said shaft, a chain which is wound around said shaft as the latter rotates, and means whereby said shaft may be rotated by said handle.

In testimony whereof, I have signed my name to this specification in the presence of two subscribing witnesses, this fourth day of March A. D. 1903.

LOUIS PFINGST.

Witnesses:
  A. L. MESSER,
  A. R. LARRABEE.